Feb. 22, 1966     F. HAPPEL     3,236,207
METHOD OF MECHANICAL MILKING
Filed Feb. 13, 1964     9 Sheets-Sheet 1
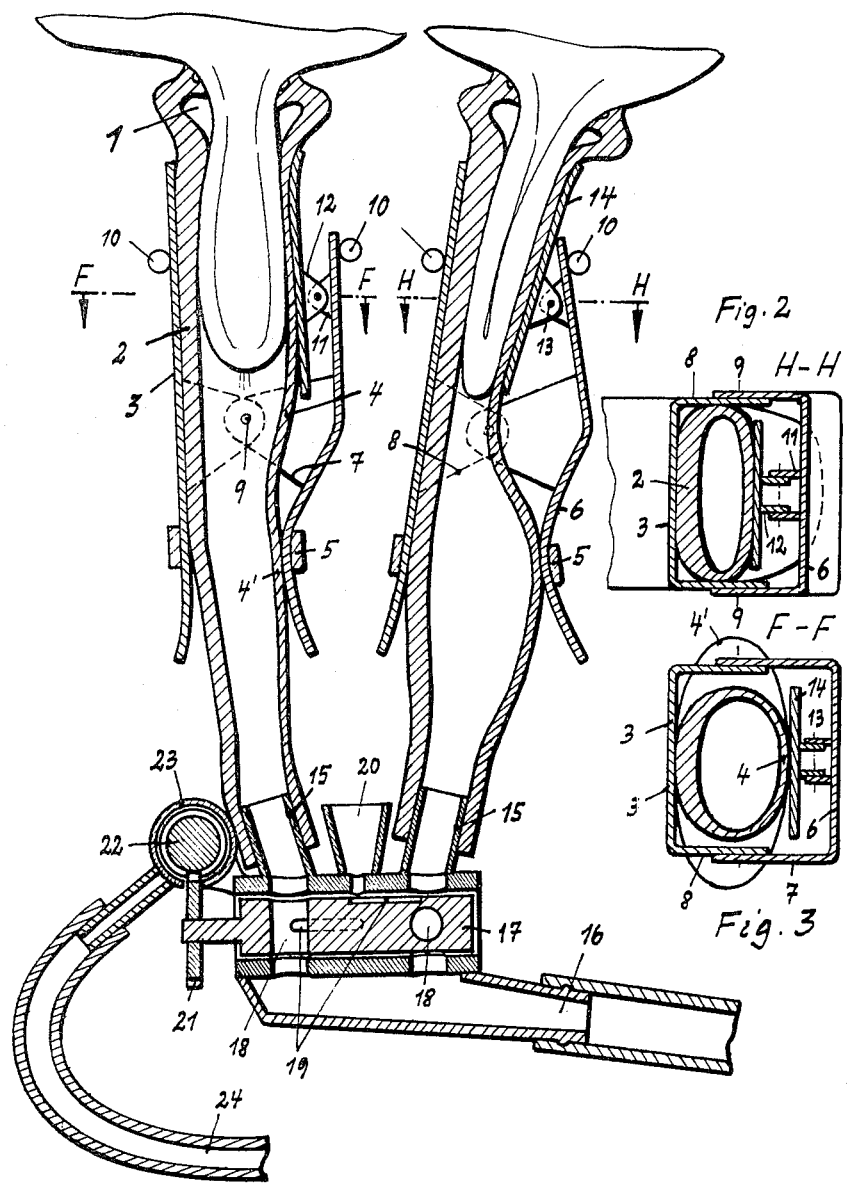

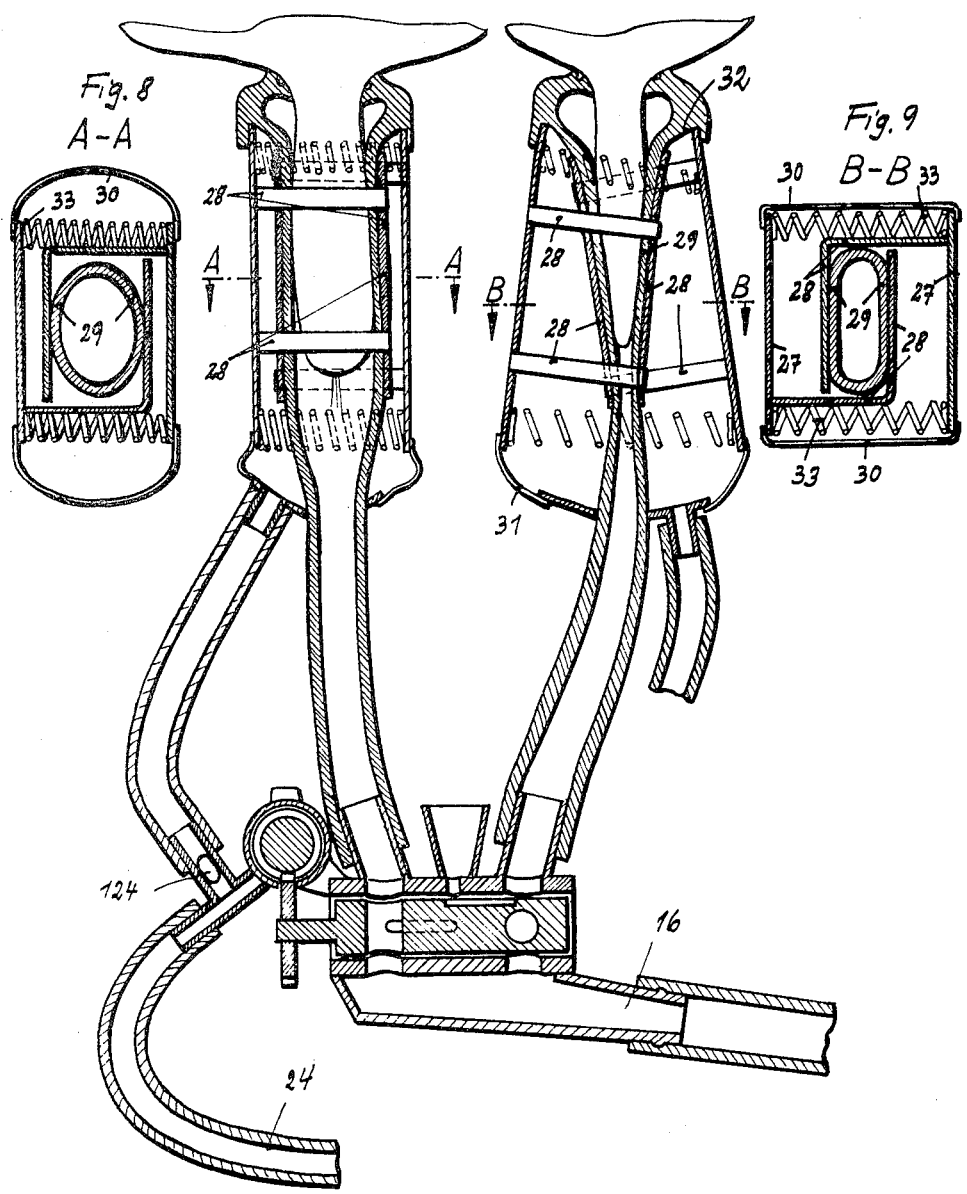

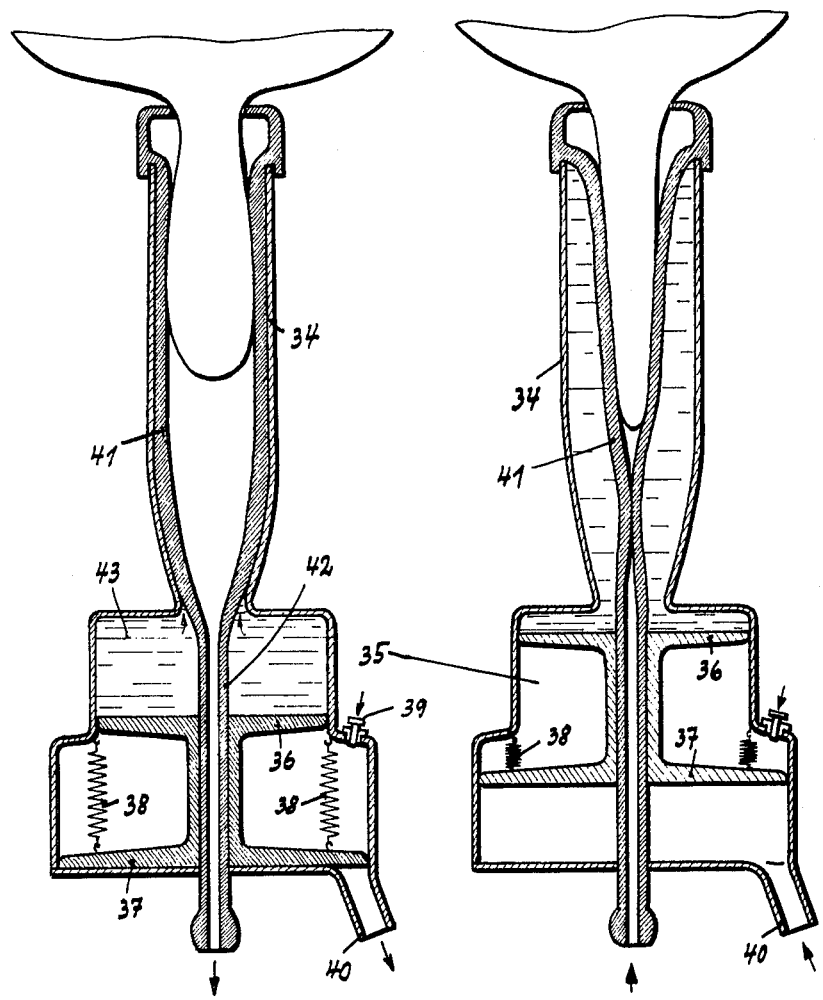

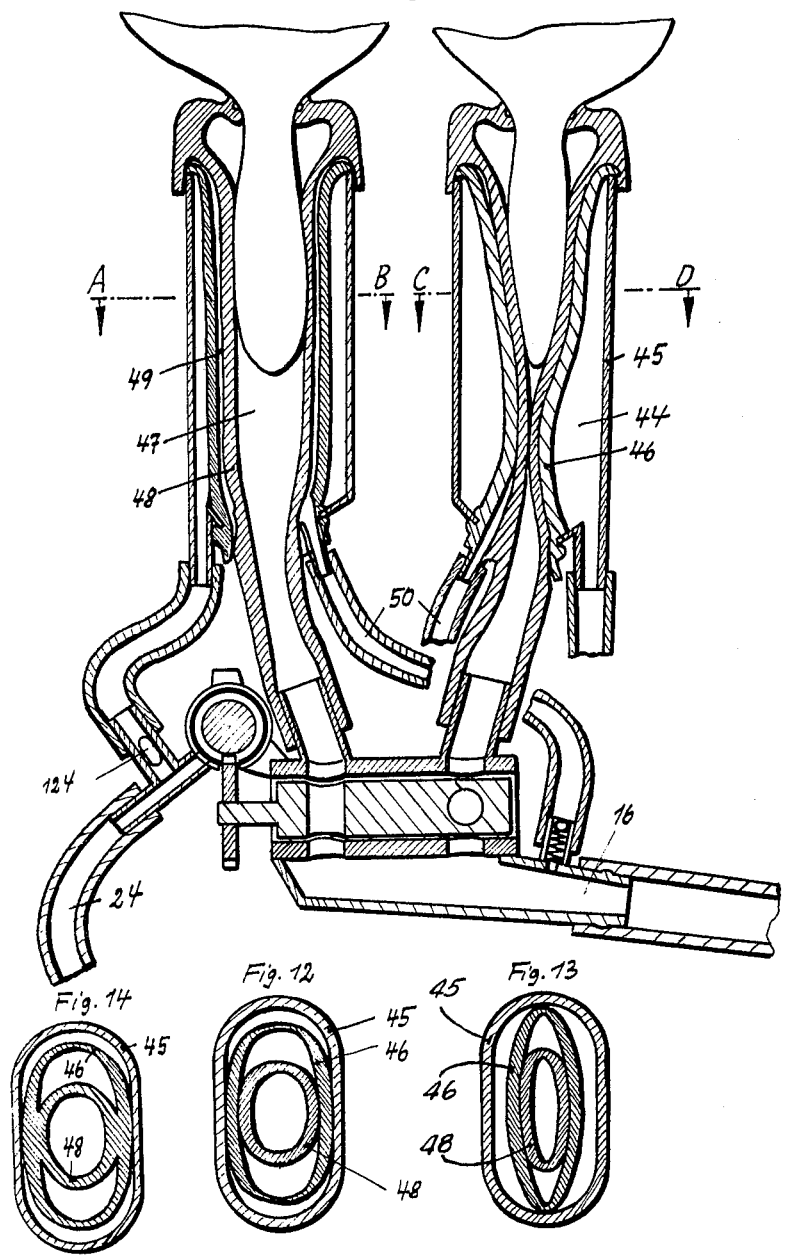

United States Patent Office 3,236,207
Patented Feb. 22, 1966

3,236,207
METHOD OF MECHANICAL MILKING
Fritz Happel, Salenwang, Bavaria, Germany (Steinhagenerstrasse 290, Isselhorst, Westphalia, Germany)
Filed Feb. 13, 1964, Ser. No. 344,779
Claims priority, application Germany, May 3, 1963,
H 49,040; Sept. 24, 1963, H 50,360
9 Claims. (Cl. 119—14.02)

The invention relates to a process of, and a device for, machine milking in which the interior of a teat cup is alternately subjected to negative and atmospheric pressures or differing negative pressures.

Numerous designs providing this result are known. They have however not been found to be satisfactory since they frequently cause damage to the udder, deformation of the teats and have other detrimental effects. Furthermore, a considerable degree of subsequent hand milking by hand is often necessary. In any case some cows are very difficult to milk by machine or cannot be milked by machine at all.

It is an object of the invention to obviate these difficulties and disadvantages. According to one aspect of the present invention, there is provided process for machine milking in which the interior of a teat cup is alternately subjected to negative and atmospheric pressures or to differing negative pressures, wherein the interior of the teat cup is alternately subjected to, and relieved from, the negative pressure of a permanent suction which is effective at least as far as the connecting piece for all four teat pipe branches and, during periods of suction relief, the teats are subjected at their lower portion to pressure massage with the upper teat portion unconstricted.

According to another aspect of the invention, there is provided device for the production of massage pressure with the assistance of the alternating effect of the negative pressure required for milking on the one hand and of the atmosphere on the other hand, for the purpose of carrying the process noted above, characterized in that the working surface of a diaphragm subjected to the said alternating effect or of a piston or the like is larger than the teat surface to be acted upon.

In order that the invention may be more fully understood, several constructions of milking devices of the invention will now be described with reference to the accompanying drawings, in which:

FIGURE 1 shows a single-chamber teat cup in longitudinal section,

FIGURE 2 shows a cross-section taken in the plane H—H of FIGURE 1,

FIGURE 3 shows a cross-section in the plane F—F of FIGURE 1,

Figure 4:
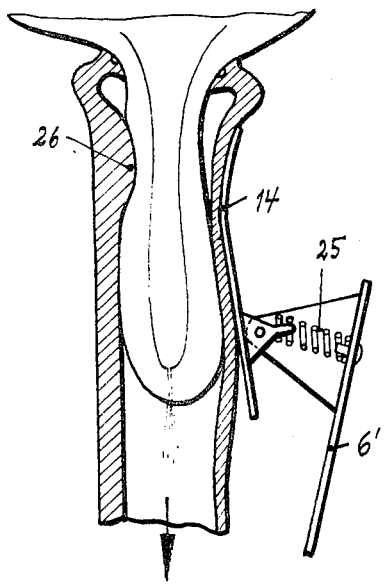
Figure 5:
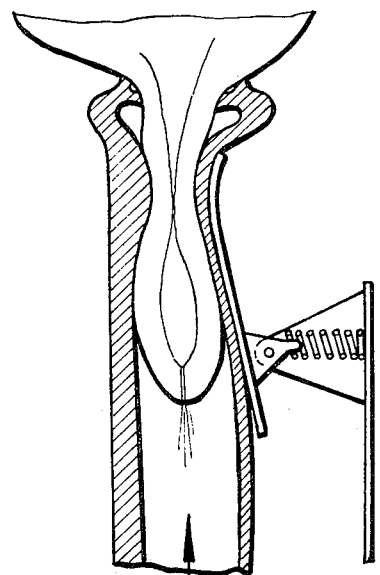
Figure 6:
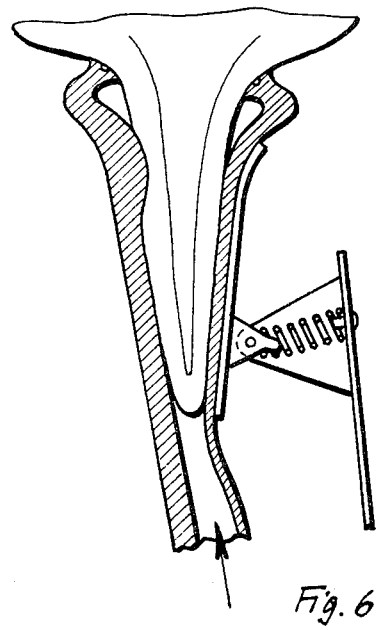
Figures 15, 16, 17:
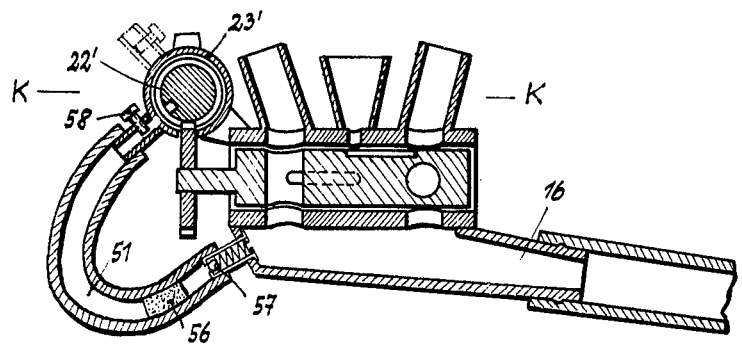
Figure 18:
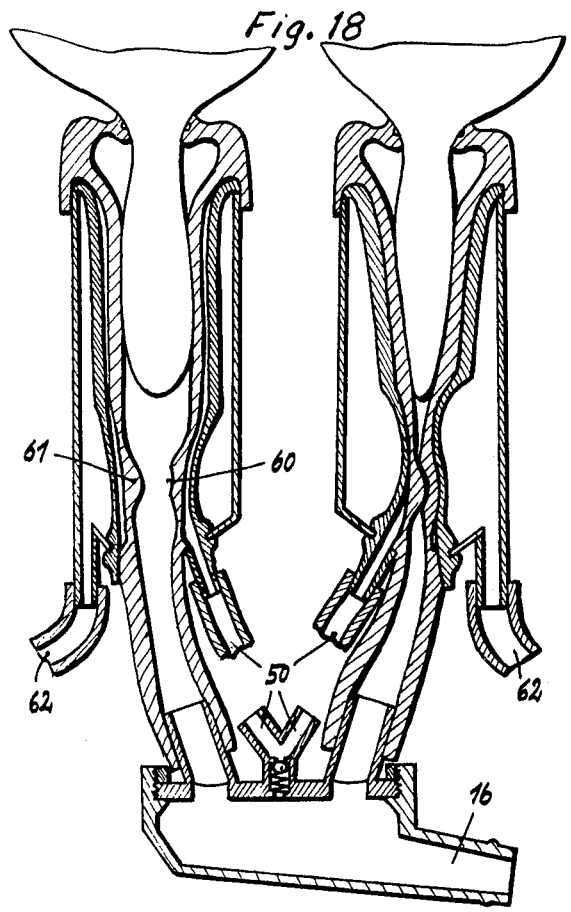
Figure 19:
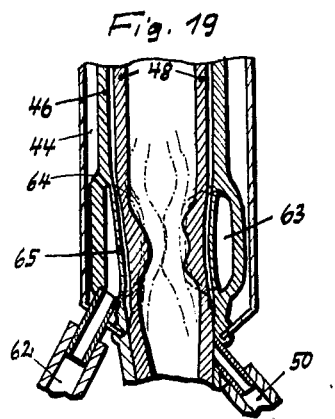

FIGURES 4–6 show a detail of a design for the removal of milk in the relief phase, in three different positions, FIGURE 7 shows a form of two-chamber teat cup with spring energy-storage means, in longitudinal section, FIGURE 8 shows a section in the plane A—A of FIGURE 7, FIGURE 9 shows a section in the plane B—B of FIGURE 7, FIGURE 10 shows a form of a two-chamber teat cup with a pressure piston and liquid pressure transmitting means, FIGURE 11 shows a form of three-chamber teat cup, FIGURE 12 shows a section along the line A–B of FIGURE 11, FIGURE 13 shows a section along the line C–D of FIGURE 11, FIGURE 14 shows a further variant, FIGURE 15 shows a modified control member, FIGURE 16 shows a longitudinal section in the plane K—K of FIGURE 15, FIGURE 17 shows a plan view of the control valve, FIGURE 18 shows a further variant, FIGURE 19 shows a modification of the device shown in FIGURE 18.

Figure 20:
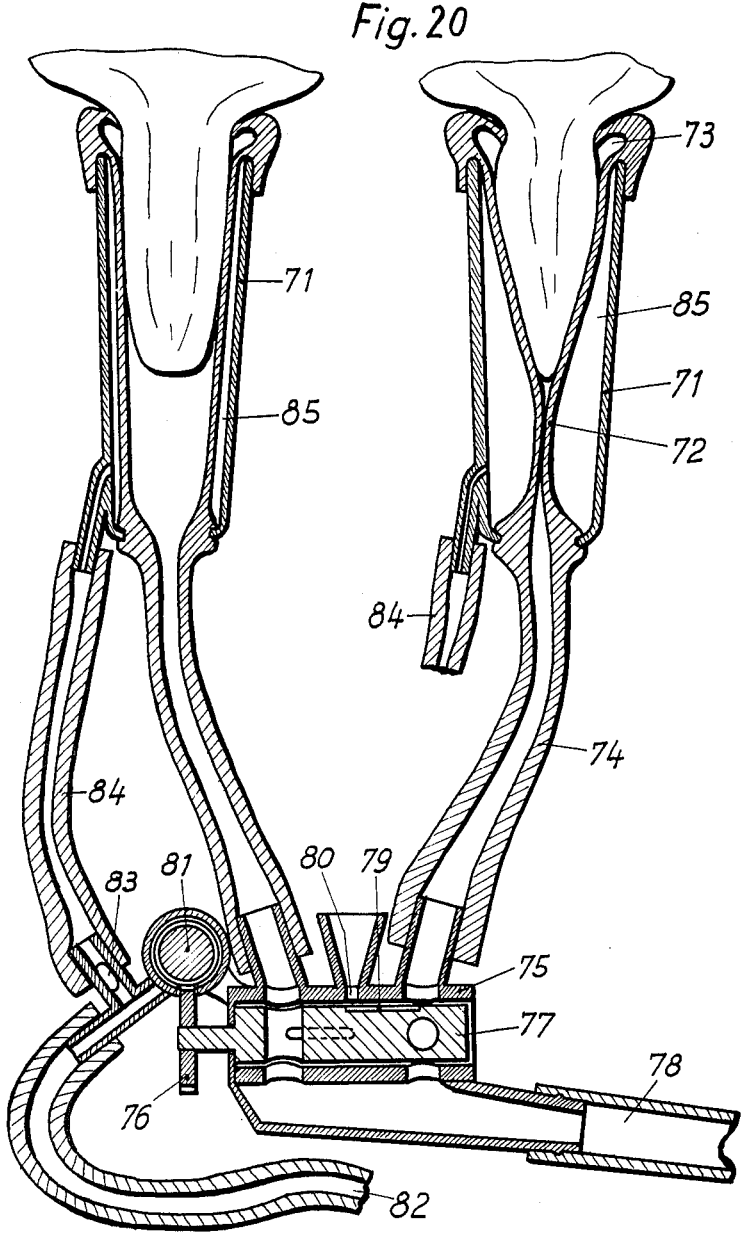
Figure 21:
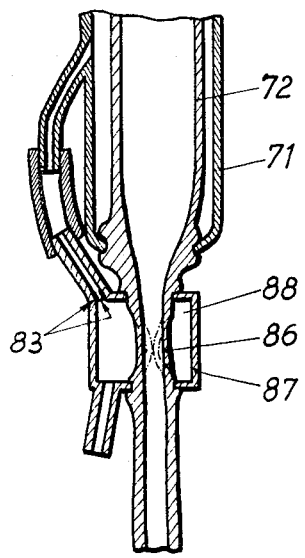
Figure 22:
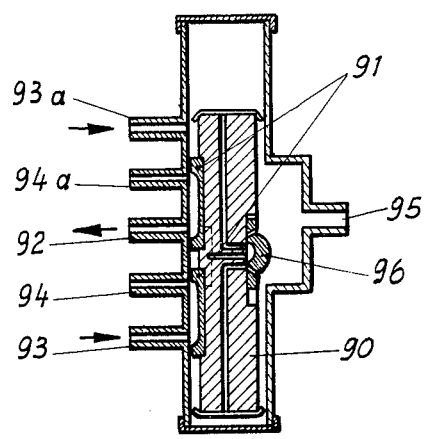

FIGURE 20 shows a further alternative milking device,

FIGURE 21 shows a modification which may be made of the device of FIGURE 20, and FIGURE 22 shows a modified air control means.

Referring to FIGURES 1–3, the single-chamber teat cup illustrated has an adhesion chamber 1 between two sealing-ring lips with the aid of which the cup adheres to the teat. This adhesion is assisted by the frequency of alternation of the suction and relief phases being approximately 80 to 120 times per minute. One side wall 2 of the rubber teat cup has a wall thickness which is at the most only slightly flexible and which carries a reinforcing plate 3 vulcanised on to its exterior. The opposite wall 4 is extremely resilient especially in its lower portion 4' at which the interior width of the cup is considerably widened, as can be seen from FIGURE 3. At this point 5 there is secured to the cup the lower limb of a clip 6 having two laterally-cranked straps 7 against which corresponding straps 8 of the plate 3 abut. Each pair of abutting straps are pivotally connected by means of pins 9. The upper end of the clip 6 is surrounded by a pre-tensioned spiral spring 10 or a corresponding rubber band which is arranged around the teat cup. Under the force of this spring, in the state illustrated for the right-hand teat of FIGURE 1, in which the teat cup interior is connected to atmosphere, the upper limb of the clip 6 is pivoted about the pins 9 towards the oppositely-positioned teat cup wall 2. During this movement, a pressure plate 14 pivotally connected to the upper limb of the clip by means of arms 11 on the clip and arms 12 on the plate at 13 is brought into the position shown for the right-hand teat where the lower portion of the teat is subjected to pressure massage whereas the upper teat portion remains unconstricted. Thus, blood is able to flow back from the tip of the teat through the veins, especially since atmospheric pressure or almost atmospheric pressure obtains in the teat cup interior.

If, on the other hand, the teat cup interior is subjected to negative pressure, the externally-obtaining atmospheric pressure or the pressure difference at the point 5 produces a pivoting movement of the clip 6 which, due to limiting stops, not shown and provided for example on each pair of straps 7, 8, causes the teat cup to adopt a state such as is shown for the left-hand teat of FIGURE 1. The effective force exerted on the clip 6 is, in this connection, so considerable that the spring 10 is correspondingly extended and the teat is not pressed in at the wall portion immediately above the portion 4. The milk removal takes place unhindered and to the full extent.

For the control of the two alternating rhythmic movements, use is made of a control member associated with the stub pipe 15 of which each teat cup—or the two teat cups of each pair in the case of a four cup arrangement—are connected. The control member is disposed between the pipes 15 and a pipe 16 which is connected to a continuously operating suction device. The control member comprises a cock plug 17 pivotal through 90° in each case and in the plug two connecting conduits 18 which are offset through 90° establish or close a connection between the respective pipes 15 and the pipe 16 and two longitudinal grooves 19 which are also offset through 90° establish or interrupt a connection between a stub pipe 20 which opens to atmosphere and the respective stub pipes 15. Movement of the cock plug 17 is effected via a gear wheel 21 and a piston 22 carrying a rack, the end faces of the piston, which is mounted within a cylinder 23, being alternately subjected to pressure, via pipes 24 from a pulsator (known and not shown).

Referring now to FIGURES 4–6, here there is provided between the plate 14 and the upper limb 6' a spring 25 designed in the manner as a tipping spring which exerts an over-centre or tumbler switch movement. The state illustrated in FIGURE 4 corresponds to the state shown for the left-hand teat of FIGURE 1 in which removal of the milk takes place under suction. FIGURE 5 shows the first part of the changeover movement due to the clips 6 in which pressure massage is exerted on the teat from above, so that the removal of milk also takes place although atmospheric pressure already obtains in the interior of the teat cup. FIGURE 6 shows the final state of the pressure massage in the relief state corresponding exactly to the state as illustrated with regard to the right-hand teat in FIGURE 1, where milk-removal ceases. In the thick wall portion of the milk teat cup is a pressure bulge 26 which, in co-operation with the pressure plate 14, assists the removal of milk.

Referring now to FIGURES 7–9, in the two-chamber teat cup here illustrated, an outer shell is formed by two rigid pressure plates 27 each of which carries one upper and one lower rigid angled hook 28 the free limbs of which extend parallel to the plates and engage behind the side of the teat cup 29 remote from the particular plate. The plates 27 are joined together at the sides by resilient diaphragms 30 and underneath by concertina walls 31, to form a closed chamber the upper side of which is closed by the adhesion chamber part 32 which constitutes a pivoting bearing for the plates 27. Pretensioned compression springs 33 tend to spread the plates 27 apart (as shown in FIGURE 9) thus to compress the cup. This is possible if atmospheric pressure obtains both in the interior of the teat cup and in the chamber formed between the teat cup and the surrounding shell. This relief state with pressure massage is illustrated for the teat shown on the right-hand side in FIGURE 7. If, on the other hand, the interior of the teat cup and the surrounding chamber are subjected to negative pressure, as demonstrated for the left-hand teat, then the atmospheric external pressure compresses the springs 33 and opens the cup, as shown also in FIGURE 8. The force transmission resides in the fact that the wall parts 27 projects beyond the wall parts of the inner cup 29. By means of a throttle means 124, the following result can be achieved. During the change from the relief to the suction states, the vacuum becomes effective on the teat tip which is still compressed, and this protects the teat from damage.

Referring now to FIGURE 10, a further possible way of designing a double-chamber teat cup for the carrying into effect of the process according to the invention will now be described. The outer shell 34 is rigid and merges into a compensation chamber 35 closed off by a piston 36 rigidly connected with a larger piston 37 as a double piston, suspended by means of a tension spring 38 from the rigid outer wall. The space between the two pistons is continuously connected, by an aperture 39, with the atmosphere whereas the underside of the larger piston 37 is alternatingly subjected, via the pipe 40, to negative pressure and atmospheric pressure. The inner cup 41 is resilient and merges into a stiff tubular portion 42. If, as shown in FIGURE 10 for the lefthand teat, the cup is subjected to negative pressure, the pipe 40 is also subjected to negative pressure. The piston 37 travels downwardly against the force of the springs 38. As it does so, the piston 36 displaces the transmission liquid 43 contained between the outer shell 34 and the inner cup 41 into the compensation chamber 35. The inner cup 41 bears against the outer shell 34. In the relief stroke, the inner cup chamber is connected to atmospheric pressure, and so is the pipe 40. The springs 38 draw the large piston 37 upwardly; the small piston 36 presses the transmission liquid 43 out of the compensation chamber 35 and causes the resilient inner cup walls 41 to exert a massage pressure on the lower portion of the teat.

In the embodiment illustrated in FIGURES 11–14, there is provided between the outer envelope chamber 44, which is bounded by a rigid outer envelope 45 and a resilient inner envelope 46, on the one hand, and the teat cup inner chamber 47 formed by the teat rubber 48 on the other hand, a further envelope chamber 49 which is positioned between the teat rubber 48 and the resilient shell 46. The intermediate envelope chamber 49 is permanently connected to negative pressure via pipes 50. As can be seen from the cross-sectional illustrations of FIGURES 12 and 13, the shell 46 acting as a diaphragm has a considerably larger cross-section surface than the teat rubber 48.

If, during the suction stroke, the teat cup inner chamber 47 is connected to negative pressure, as shown for the left-hand teat, then also the outer envelope chamber 44 is connected to negative pressure. For the relief stroke, the teat cup inner chamber 47 is disconnected from the suction device by the rotation of the cock plug, as shown for the right-hand teat. A connection with atmosphere is superfluous if the chamber enclosed between the cock plug and the teat is so calculated that an adequate decrease in the negative pressure for relief purposes takes place simply by the collapse of the teat rubber. The collapse is effected by raising the outer envelope chamber 44 to atmospheric pressure which due to the throttle point 124 prevails a short time after the rotation of the cock plug and after the resulting separation from the permanent suction means 16. Due to the fact that the cross-sectional area of the diaphragm 46 is larger than that of the teat rubber 48, a positive massage pressure is exerted on the teat rubber 48 and hence on the teat lower portion. This design does not require any energy-storing springs.

FIGURE 14 shows how the diaphragm 46 and the teat rubber 48 can be manufactured in a single unit. In this case, the intermediate envelope chamber 49 can be oppositely acted upon relatively to the outer envelope chamber 44.

FIGURES 15 and 16 shown a further simplification in the control device compared with that described above in which it is necessary to connect, via a pipe 24 (FIGURE 1) a pulsator. According to FIGURES 15, 16 the piston 22' in the cylinder 23' can itself be designed as a pulsator, its cylinder being connected at 50 with the continuously operating suction device via a pipe 51 and its piston having a recess which is flush with the mouth 50 of the pipe 51 in a predetermined piston position. A conduit 54 leads from the recess to a control slide 53. The control slide which is disposed on the piston, travels to and fro with the latter and is automatically reversed by end stops, the action on the cylinder chambers, effected via central conduits 54', alternating at the end faces of the piston. From the said cylinder chambers lead connecting stub-pipes 55 which may for example provide the alternating action on the outer envelope chamber according to FIGURE 11 of the teat cups. The pipe 51 contains a filter insert 56 and is connected in readily detachable manner to a stub pipe having a non-return valve 57 on the suction pipe 16. A throttle means 58 permits regulation of the frequency of alternation from suction to relief to between 80 and 120 strokes per minute.

FIGURE 17 demonstrates, in a plan view of the cock plug on the control member, the possibility of arranging, by special design of the mouth inlet 59 of the cock bore 18, that the depression shall not be established too suddenly in the teat cup inner chamber—this is a necessary arrangement for the milking process.

The embodiment diagrammatically illustrated in FIGURE 18 operates, in principle, in the same way as the embodiment according to FIGURE 11. It differs only from the latter embodiment inasmuch as the cock plug provided in FIGURE 11 in the junction for all the teat pipe branches, has been omitted and replaced by a groove 60 and a bead 61 on the wall parts of the teat cup located below the teat. If atmospheric pressure acts on the external envelope chamber 44 from the pulsator and via the pipe 62, then not only is the teat cup inner chamber relieved from negative pressure by collapse but at the same time the groove 60 and the bead 61 are joined together, so that the teat is disconnected from the suction device.

In order that this disconnection may take place in every case a short time before the collapse of the wall parts of the teat rubber, according to FIGURE 19, it is possible to provide in the zone of the groove and bead of the teat rubber, within the central intermediate wall 46, a preliminary chamber 63 for the pipe connection 62 from the pulsator. After the passage through this chamber the action of atmospheric air becomes only subsequently effective via a narrow aperture 64 in the outer envelope chamber 44. The wall 65 adjacent the teat rubber 48 of the preliminary chamber 63 is designed as a thin-walled diaphragm which, when atmospheric pressure acts on the preliminary chamber, brings about the closure of the groove 60 and the bead 61, as shown in broken lines in FIGURE 19. Only after this has taken place, does the volume-collapse become effective below the teat tip and with it the relief from negative pressure. Weakened wall portions in the teat and massage rubber permit the carrying into effect of massage with or without removal of milk, as described at the outset. By means of corresponding dimensioning (not shown) of the wide side of the massage rubber, various pressures can be exerted on the teat rubber and therewith on the teat cup inner chamber.

The above described embodiments make possible the withdrawal of milk in the suction state with the maximum possible efficiency. Due to the pressure massage on the lower portion of the teat, the subsequent trickling of the milk out of the ramifications of the milk gland is encouraged; at the same time however, the return flow of the blood into the teat veins is assisted and in this connection it is an important factor that the upper portion of the teat is not constricted. For the return flow of the blood it is an essential requirement that atmospheric pressure or at most a weak negative pressure should obtain in the inner chamber of the milk cup. The reason for the failures which have been enumerated is to be found above all in the non-observance of these factors in connection with the hitherto-known processes. When the process according to the invention is utilised, it will be possible to milk with a vacuum which is as high (i.e. between 0.5 to 0.8 kg./cm.$^2$) as will obtain during the suckling of a calf and furthermore the maximum efficiency is attained without any kind of difficulty or damage. The teats are completely "milked-out" and any subsequent milking by hand becomes unnecessary.

The pressure massage on the lower portion of the teat during the relief phase with the unconstricted upper part can also take place at the end of a pressure massage effected in the upward direction. Then, in this first part of a pressure massage, milk is also removed during the relief phase, similar to the sucking of the calf. This can, however, be relinquished in order to leave time for the milk subsequently to trickle out of the milk gland in the same way of course as the calf changes over to another teat when the flow of milk ceases, this being something which is not imitated in machine milking.

The production of the massage pressure in the relieved state of the teat cup inner chamber, as is required by the invention, can of course be achieved in other ways and with different auxiliary means. It is of course especially desirable that production should be possible without having recourse to "foreign forces." It is however not possible in this case to make use of a means as primitive as that utilised in the known double-chamber teat cups, i.e. that the resilient teat rubber walls is allowed, whilst maintaining the vacuum in its interior, to collapse due to the introduction of atmospheric pressure into an outer envelope chamber. If this is done, a strong negative pressure remains in the inner chamber of the teat cup and this prevents the return flow of the blood out of the tip of the teat; any relief of the vacuum immediately eliminates the massage pressure.

Referring now to FIGURE 20, the double-chamber teat cup here contains a rigid outer shell 71 and the teat rubber 72 which forms an adhesion chamber 73 with sealing-ring lips is provided at the opposite end with a pipe 74 connected to a rotary control valve housing 75. On the other side of the cock plug 77 adapted to be alternatingly rotated through 90° with the aid of a tooth segment 76, is the suction pipe 78 connected to a continuously operating suction device by means of which cock, via the pipe 74, the teat cup inner chamber is alternately connected and disconnected from the device. In the latter case, on every occasion, the teat cup inner chamber is connected via a longitudinal groove 79 in the cock plug with the atmosphere at 80. The alternating to and fro rotation of the cock plug is effected by a control slide 81 acted upon by compressed air as it is generated by a compressor, controlled by the pulsator (not shown) and supplied via a pipe 82, in the desired periodic sequence. The compressed air acts, through a throttle 83, which provides a time lag, and a pipe 84 on the intermediate space 85 between the teat cup 72 and the shell 73. By this means, the teat rubber 72 is, after previous relief of its interior from negative pressure, compressed as shown for the right-hand teat in the drawing, so that the desired massage is effected in the relief stage. In the teat cup interior and intermediate chamber 85 of the teat positioned to the left in the drawing, the same negative pressure obtains in the state illustrated. The teat rubber 72 is in its natural form and does not in any way impede the complete milk removal.

Instead of the control slide illustrated, which in the relieved state, establishes a connection with the atmosphere at 80, it is also possible to use a control slide which, in the relief state, does not establish a connection of this kind but which adequately relieves the interior of the teat cup from negative pressure, by means of a simple volume diminution.

The same effect can be achieved, in this case not by a separate control slide but by the arrangement of a shut-off locking means 86 in the pipe (according to FIGURE 21 closely below the double chamber teat cup 71, 72, if a chamber 88 surrounding the locking means is charged with compressed air before the air passes from this chamber via a throttle 83 into the outer envelope chamber of the teat cup.

Instead of the throttle, use can expediently be made of a device for the precise control of the time at which massage commenced relatively to the disconnection from the vacuum, and FIGURE 22 shows a diagrammatically such a device. The figure shows a design of a control piston 90 for a control slide 81 on which control mirrors 91 are provided, the said control mirrors co-operating exactly with stub pipes 92, 93, 93a and 94, 94a when they are displaced past them. 92 is connected with the continuously operating suction device, 93, 93a with the air pressure and 94, 94a with the pipes 84 establishing connection with the outer envelope chamber of the teat cup. The to and fro movement is effected by the action at 95 of compressed air with automatic switch-over with the aid of the control slide 96, so that the control slide is simultaneously effective as a pulsator. Actuation with compressed air has the advantage that a higher positive pressure is available than that provided by the pressure difference between the permanent vacuum and the atmosphere.

The above proposal to use compresesd air as the extraneous pressure means for producing the massage pressure makes it possible to carry out the above process for machine milking, which permits complete milking-out of the teats without subsequent manual milking with double-chamber teat cups of conventional design, so that milking equipment which is already available can be used and only the pulsator requires to be connected at its bore, hitherto communicating with the atmosphere, with a compressed air pipe. Since the compressed air requires to have only a slight degree of excess pressure (maximum approximately one atmosphere excess pressure) it is possible to use commercially-conventional flexible tubings by pushing them onto corresponding connecting pipes, the tubing being at the most additionally secured with the aid of tubing clamping means. A flexible piping of this kind can easily be arranged along the already-available vacuum pipe line as far as a compressed air pump. With equipment of this kind, the outer envelope chamber of the double-chamber teat cup is alternately acted upon by negative pressure or atmospheric positive pressure.

The device for periodically disconnecting the teat cup inner chamber from the suction device (i.e. the control device with or without establishment of a connection to atmosphere or a teat cup/teat rubber closure means) is adapted to be controlled by the compressed air and its actuation takes place by a predetermined interval of time before a throttling means acts upon the teat cup envelope chamber. By this measure, the result is achieved that the relief from suction is commenced in the relief phase and massaging is effected only thereafter and that at the commencement of the suction pull the teat tip is still supported. Both steps are advantageous for the milking process.

I claim:

1. A method for the removal of milk from the teat of an animal, said method comprising surrounding the teat of an animal to be milked with a teat cup, alternately applying suction pressure and atmospheric pressure within the cup, engaging the teat with the teat cup during the periods in which atmospheric pressure is produced within the cup, applying a massaging pressure at the lower end of the teat while the upper portion of the teat is left unconstricted, and withdrawing milk from the teat during the application of suction pressure within the cup.

2. A method as claimed in claim 1 comprising relieving the pressure of the cup on the teat during the application of suction pressure.

3. A method as claimed in claim 1 comprising gradually displacing the force applied to the teat by the cup from the upper end thereof to the tip as the pressure cycle is commenced.

4. A method for the removal of milk from the teat of an animal, said method comprising surrounding the teat of an animal to be milked with a teat cup, alternately applying suction pressure and atmospheric pressure within the cup to produce alternate suction and pressure cycles, engaging the teat with the cup at the end of the suction cycle, applying a force to the teat near the upper base end thereof, continuing the application of force at said upper base end during commencement of the pressure cycle to constrict the teat at said upper base end and then gradually lowering the force applied to the teat during said pressure cycle to apply a relatively slight massage pressure to the teat at said tip while leaving the upper base end of the teat unconstricted to permit the flow of blood from the tip of the teat, the milk being withdrawn from the teat at least during the suction cycle.

5. A method as claimed in claim 4 wherein milk is also withdrawn from the teat during the commencement of the pressure cycle when the teat is constricted at the upper base end.

6. A method for the removal of milk from the teat of an animal, said method comprising surrounding the teat of an animal to be milked with a teat cup, alternately applying differential pressure within the cup to develop alternating suction and relief cycles, controlling the pressure within the cup so that the pressure is greater in the relief cycles, engaging the teat with the cup to apply a force to the teat at the upper base end thereof during the end of the suction cycle, and gradually lowering the force along the teat during the relief cycle to apply slight massage pressure to the teat at said tip while leaving the upper base end of the teat unconstricted to permit the flow of blood from the tip of the teat to the upper base end thereof, the milk being withdrawn from the teat at least during the suction cycle.

7. A method as claimed in claim 6 comprising continuing to apply force to the teat at the upper base end thereof at the commencement of the relief cycle to constrict the teat thereat.

8. A method as claimed in claim 6 wherein the massage pressure is applied to said tip of the teat at the end of the relief cycle.

9. A method as claimed in claim 8 comprising rhythmically moivng the point of application of force on the teat along said teat during the alternating cycles.

References Cited by the Examiner

UNITED STATES PATENTS

| | | | |
|---|---|---|---|
| 500,713 | 4/1893 | Kastengren | 119—14.25 |
| 1,048,481 | 12/1912 | Aslakson | 119—14.52 |
| 1,089,838 | 12/1914 | Hulbert | 119—14.31 |
| 1,329,452 | 3/1920 | Babson et al. | 119—14.25 |
| 2,254,092 | 8/1941 | Schmitt | 119—14.02 |
| 2,470,169 | 5/1949 | Howse | 119—14.25 |
| 2,712,298 | 7/1955 | Bajema | 119—14.02 |

SAMUEL KOREN, *Primary Examiner.*

ALDRICH F. MEDBERY, *Examiner.*